US006941284B2

(12) United States Patent
DeFilippo et al.

(10) Patent No.: US 6,941,284 B2
(45) Date of Patent: Sep. 6, 2005

(54) METHOD FOR DYNAMICALLY USING CRYPTOGRAPHIC KEYS IN A POSTAGE METER

(75) Inventors: Craig J. DeFilippo, Milford, CT (US); Joseph L. Gargiulo, Trumbull, CT (US)

(73) Assignee: Pitney Bowes Inc., Stamford, CT (US)

(*) Notice: Subject to any disclaimer, the term of this patent is extended or adjusted under 35 U.S.C. 154(b) by 613 days.

(21) Appl. No.: 09/726,744

(22) Filed: Nov. 30, 2000

(65) Prior Publication Data

US 2002/0065782 A1 May 30, 2002

(51) Int. Cl.[7] ............................ H04K 1/00; G06F 17/60

(52) U.S. Cl. ........................... 705/62; 705/60; 705/401; 705/405; 705/408; 705/410; 380/4; 380/23; 380/25; 380/28; 380/49; 380/50; 380/54

(58) Field of Search ............................ 705/60, 62, 401, 705/405, 408, 410, 57; 380/4, 23

(56) References Cited

U.S. PATENT DOCUMENTS

| | | | | |
|---|---|---|---|---|
| 5,651,103 A | | 7/1997 | Arsenault et al. | 395/117 |
| 5,745,569 A | * | 4/1998 | Moskowitz et al. | 705/58 |
| 5,923,762 A | | 7/1999 | Dolan et al. | 380/51 |
| 6,442,525 B1 | * | 8/2002 | Silverbrook et al. | 705/1 |
| 6,587,842 B1 | * | 7/2003 | Watts | 705/57 |
| 6,609,117 B2 | * | 8/2003 | Sutherland et al. | 705/62 |
| 2002/0003547 A1 | * | 1/2002 | Bleumer | 705/62 |

FOREIGN PATENT DOCUMENTS

| | | | |
|---|---|---|---|
| DE | 1040526 | * 10/1996 | 705/62 |

OTHER PUBLICATIONS

World Wide Web War: Battle of the Browsers–(Software and online companies aer trying to cash in on the world Wide We with theirt own commercial versions of Mosaic) Interactive Age, vol. 2, No.: 6, pp.: 44+, Jan. 16, 1995.*

Choosing from the rising tide of controllers. Gunn, Lisa–Electronic Design, vol.: 37, No.: 6, pp.:51(7), Mar. 23, 198.*

* cited by examiner

*Primary Examiner*—James P. Trammell
*Assistant Examiner*—Daniel L. Greene
(74) *Attorney, Agent, or Firm*—Steven J. Shapiro; Angelo N. Chaclas

(57) ABSTRACT

A postage meter includes a vault that accounts for postage dispensed by the postage meter; and a printhead module having a printhead for printing the postage dispensed; a smart card chip having a ROM having software code stored therein; an EEPROM having an encrypted key and executable code stored therein, a CPU; a RAM; and a flash memory having an encrypted pointer data file stored therein. During power-up of the postage meter the encrypted pointer data file is read from the flash memory into the RAM by the CPU, the CPU uses the executable code to decrypt the encrypted pointer data file to obtain from the software code components parts of a decryption key and to assemble in the ram the decryption key from the component parts, the CPU uses the assembled decryption key and the executable code to decrypt the encrypted cryptographic key, and the CPU stores the decrypted cryptographic key in a secure area of the EEPROM, erases the decryption key and the encrypted pointer data file from the RAM, erases the encrypted cryptographic key and executable code from the EEPROM, and erases the pointer data file from the flash memory.

20 Claims, 4 Drawing Sheets

METHOD FOR DYNAMICALLY USING CRYPTOGRAPHIC KEYS IN A POSTAGE METER

FIELD OF THE INVENTION

The instant invention relates to a method for securely producing cryptographic keys in metering devices such as a postage meter. More particularly, the instant invention is directed to the secure storage and decryption of cryptographic keys within an electronic chip.

BACKGROUND OF THE INVENTION

FIG. 1 is a schematic representation of a known postage meter 1. Postage meter 1 includes a vault 3 in the form of a smart card chip, a microprocessor 5, and a printhead module 7. Postage meter 1 is designed to dispense postage in the form of a postage indicium applied to a mailpiece and to securely account for the dispensed postage in vault 3.

Vault 3 includes a central processing unit (CPU) 9, Read-Only Memory (ROM) 11, Random Access Memory (RAM) 13, Non-Volatile Memory (NVM) 15, and an Electrically Erasable Programmable Read-Only Memory (EEPROM) 16. CPU 9 controls the operation of vault 3 by executing code stored in ROM 11. RAM 13 serves as a volatile working memory during operation of vault 3 while NVM 15 includes conventional accounting registers that are updated to securely account for the postage dispensed by postage meter 1. EEPROM 16 is used to store personalized data for vault 3.

Printhead module 7 includes a smart card chip 17 containing a CPU 19, a ROM 21, a RAM 23, NVM 25, and EEPROM 27. The smart card chip 17 components are each used to permit the printing function of the postage meter 1 to be accomplished in a known manner. Further, printhead module 7 includes an application specific integrated circuit 29, a flash memory 31, and a printhead 33 which cooperate together with the smart card chip 17 to effectuate the printing of the postage indicium as is more fully described in U.S. Pat. No. 5,651,103 which is hereby incorporated by reference.

Postage meter 1 responds to a request to dispense postage which is entered via a keyboard (not shown). In response to the postage request, and prior to the printing of an indicium, the vault 3 and printhead module 7 are designed to perform a mutual authentication procedure as is more fully described in U.S. Pat. No. 5,923,762 which is hereby incorporated by reference. During the mutual authentication process, both the printhead module 7 and the vault 3 generate a common session key using a set of authentication keys (AK) that are stored in both ROM 11 and ROM 21. Since the generation of the session key is fundamental to the mutual authentication process, the security of the authentication keys is of critical importance. Accordingly, strong measures must be taken to prevent the compromise of the set of AK.

In postage meter 1, the conventional physical and logic security features of the smart card chips 3 and 17 are relied upon to prevent access to the AK's that are stored in the clear in ROM's 11, 21. However, the process by which the AK's are put into the mask for the smart card chip 17 can be improved upon from a security viewpoint. That is, the postage meter vendor typically receives the smart card chip 17 from a third party vendor with the AK's already contained in the smart card chip 17. The third party vendor gets the AK's from the meter manufacturer, such as for example, on a floppy disc. The third party vendor then masks the smart card chip 17 with the AK's. This process of providing the third party vendor with the AK's in the clear introduces an extra link in the chain of custody of the AK's that is not desirable.

In addition to the above, a distinct set of AK's is generated for a particular domain. A domain can be a specific country or a particular region of the world. The bottom line is that a mask for a smart card chip 17 for each set of domain authentication keys is typically created resulting in increased costs in creating the various domain chip masks. Moreover, a plurality of each domain specific smart card chips 17 must be produced and procured in bulk for each domain. This leads to increased inventory control procedures to accommodate the storage and distribution of the various smart card chips 17. Additionally, if the meter manufacturer begins selling or leasing postage meters in one domain and subsequently ceases doing business there, any surplus smart card chips 17 in inventory for that domain become scrap since they cannot be used for other domains.

SUMMARY OF THE INVENTION

The instant invention is directed toward overcoming the problems discussed above in a postage metering system but is also applicable to any apparatus requiring a more secure handling of cryptographic keys. The instant invention is appropriately set forth in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENT

Figure 1:
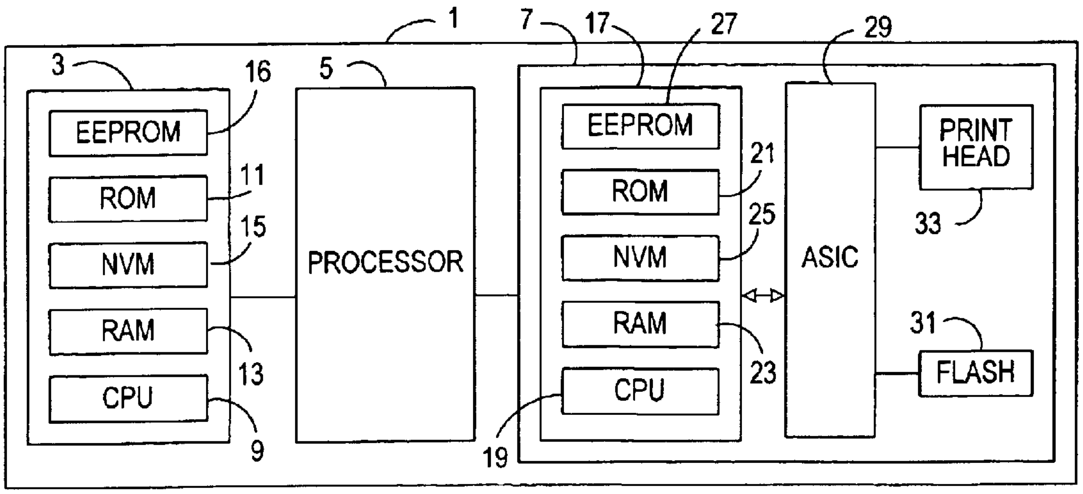
FIG. 1 (PRIOR ART)
FIG. 1 shows a prior art postage meter.
Figure 2:
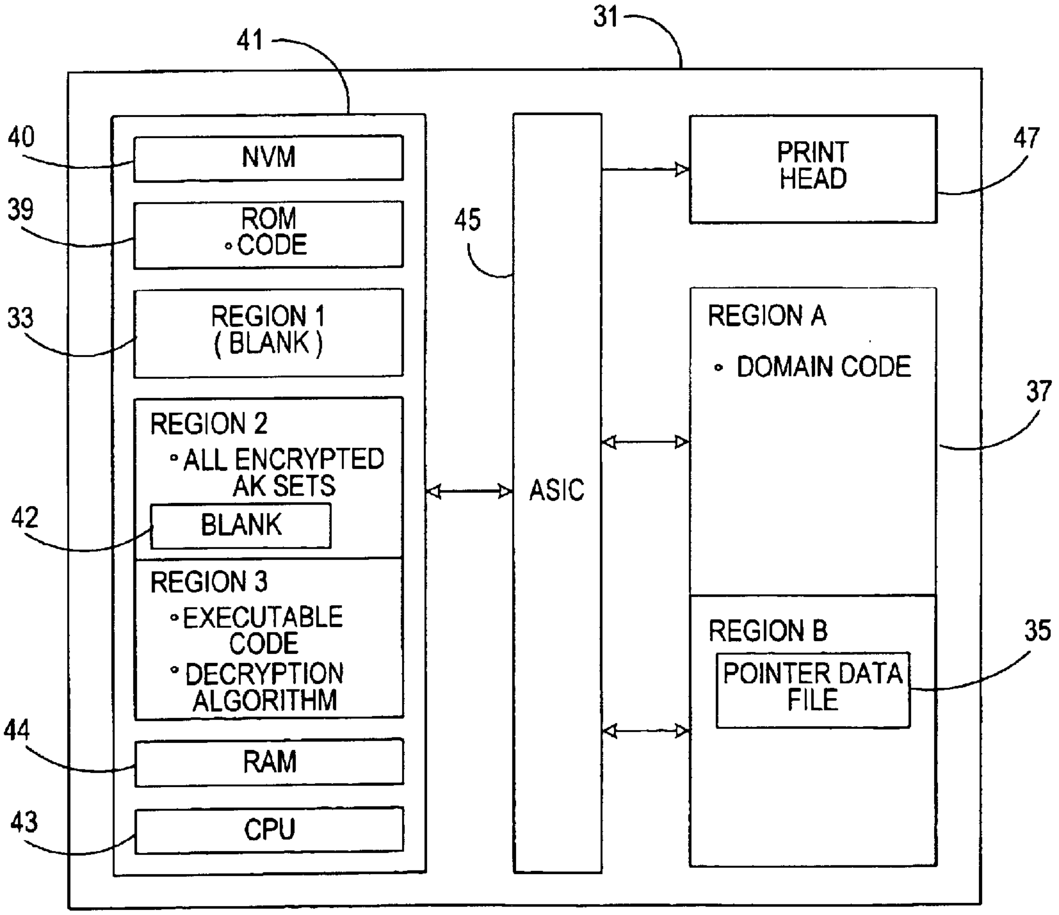
FIG. 2 shows the configuration of an inventive printhead module after an initial loading has been accomplished but prior to a power up initialization.
Figure 3:
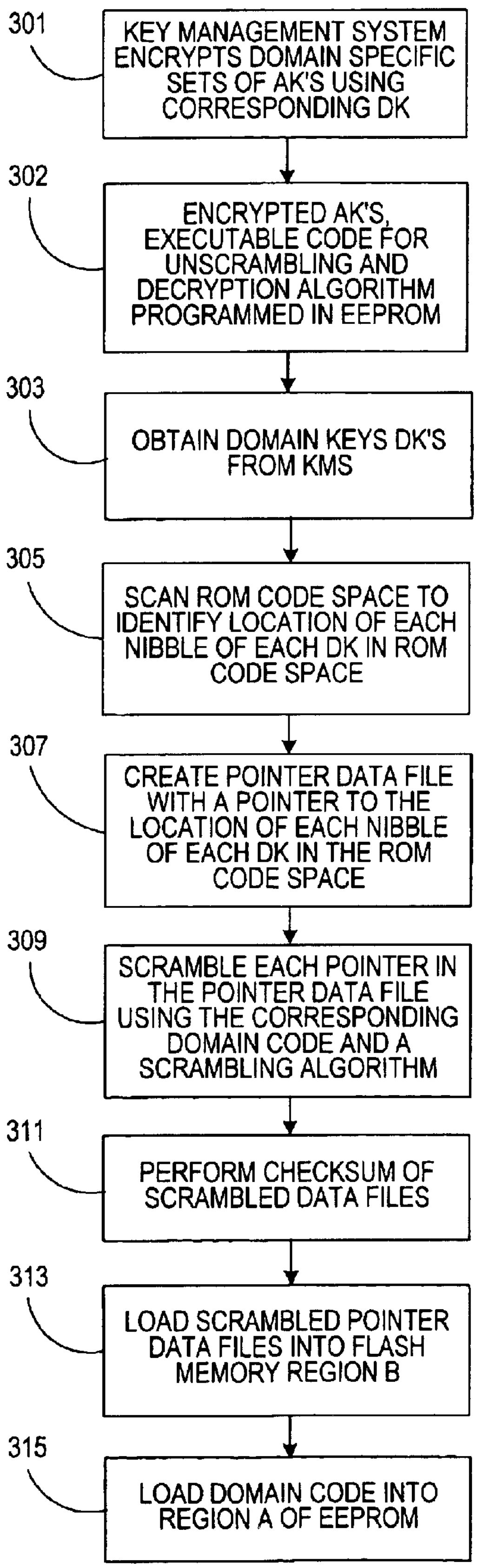
FIG. 3 is a flowchart of the initial loading process.
Figure 4:
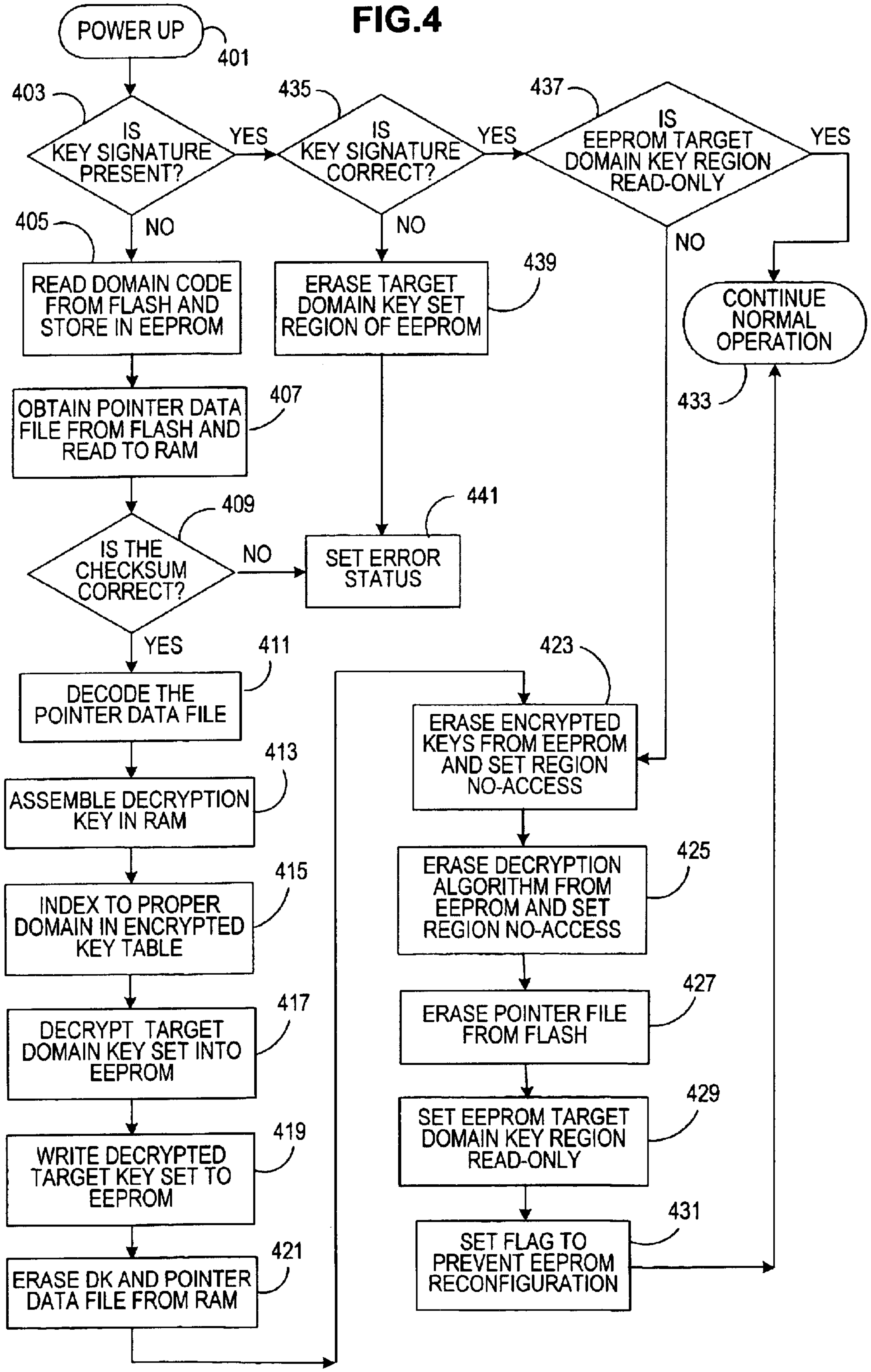
FIG. 4 is a flowchart of the initial power-up process.

Referring to FIGS. 2–4, the inventive process for securely storing cryptographic keys in an improved printhead module 31 will be described. The inventive process includes the initial loading of data and executable code into printhead module 31 and a subsequent power-up phase where the cryptographic keys are securely stored in the clear in a secure manner as per the invention.

Initial Loading of Executable Code and Data

At step 301, a key management system (not shown) uses a decryption key "DK" to encrypt a set of AK's for a corresponding domain. This process is repeated using a separate DK for each domain to produce a set of encrypted AK's for each domain. Each of the encrypted sets of domain specific AK's are then stored in region 2 of EEPROM 33 while an executable code and a decryption algorithm (the function of each which is discussed in more detail below) are stored in region 3 of EEPROM (step 302). Once the smart card chip 41 manufacturer has masked the operating code in ROM 39, completed step 302, and performed any programming required in NVM 40, the smart card chip 41 is provided to the meter manufacturer for further processing.

The meter manufacturer, upon completion of step 301, creates a pointer data file 35, as discussed in more detail below, and stores it in region B of flash memory 37. The pointer data file 35 is created by first obtaining the DK associated with each domain from the key management system (step 303). In the preferred embodiment each DK is 8 bytes and is in a hexadecimal format. Thus, for example, a DK could be represented as "AF 3F 75 42 A1 B2 34". Each of the numbers or letters of the DK is 4 bits of data and represents a "nibble" of the DK. Accordingly, once a DK is known, a software program scans the hexadecimal operating code stored in the code space of ROM 39 starting at a random location. The purpose of the scanning function is to locate 16 nibbles of data in the ROM code space that corresponds to the 16 nibbles of the DK (step 305). It should be noted that since the meter manufacturer provided the ROM code that was masked by the chip manufacturer, the meter manufacturer knows the location in ROM of the entire ROM code. Accordingly, the meter manufacturer doesn't have to physically probe the ROM code space itself to find the nibbles but can do it separate and apart from the physical smart card chip 41.

Once the 16 nibbles are found, a pointer to the location of each of the nibbles in the ROM 39 code space is stored in the pointer data file 35. This process is repeated for each domain DK until data file 35 has a set of pointers corresponding to each nibble of each domain key DK (step 307). In a preferred embodiment it is also desirable to cryptographically secure the data file 35. One such method is to scramble the pointer files for each domain DK with a domain code (that identifies the domain) and a scrambling algorithm (step 309)). A checksum is then performed at step 111 to ensure the correctness of the scrambling activity. The scrambled pointer data file is then stored in region B of flash memory 37 (step 313). Finally, when it is time to personalize a particular printhead module 31 for use in a specific domain, the desired domain code is loaded into region A of flash memory 37.

At this point in time (as reflected in FIG. 2), the printhead module 31 has all of the sets of encrypted domain specific AK's stored in EEPROM 33 but there is no DK stored in the smart card chip 41 to decrypt the AK's. Thus, in the process set forth above, the third party supplier of the smart card chip 41 never receives the sets of AK's in an unencrypted form. Moreover, while the chip supplier does receive the executable code for unscrambling the pointer data as well as the decryption algorithm for decrypting the AK's, the supplier does not have access to the pointer data file 35 and therefore cannot create the DK for any domain. Accordingly, the security of the system is greatly improved over the system described in the prior art.

Initial Power-up of Postage Meter

Referring specifically to FIGS. 2 and 4, once the postage meter is powered up (step 401) the region 2 of EEPROM 33 is checked to determine if a set of unencrypted domain keys AK's are present in a predetermined secure area thereof (step 403). If the answer is no, CPU 43 reads the domain code from region A of flash memory 37 and stores it in region 1 of EEPROM 33 (step 405). CPU 43 then obtains from pointer data file 35 the specific domain pointer data file corresponding to the domain code obtained from flash memory 37 and stores the specific domain pointer data file in RAM 44 (step 407). A checksum (step 409) is then performed on the specific domain pointer data file and if the checksum is correct, CPU 43 decodes the scrambled specific domain pointer data file stored in RAM 44 using the executable code stored region 3 of EEPROM 33 (step 411).

Once the locations in ROM 39 of the 16 nibbles of the decryption key DK are obtained by unscrambling the specific domain pointer data file, CPU 43 assembles the DK in RAM 44 (step 413). The CPU 43 then uses the domain code stored in region 1 of EEPROM 33 as a key to obtain the corresponding set of encrypted domain authentication keys AK's stored in region 2 of EEPROM 33 (step 415). CPU 43 then uses the decryption algorithm stored in region 3 of EEPROM 33 and the DK assembled in RAM 41 to decrypt the obtained target set of domain authentication keys AK's (step 417). The unencrypted target set of domain authentication keys AK's are then written into the predetermined secure area 42 of region 2 of EEPROM 33 (step 419). At this point in time, the assembled DK and pointer file are erased from RAM 44 (step 421). Then, all of the encrypted sets of domain AK's are erased from region 2 of EEPROM 33 and this region of EEPROM 33 is set so that it can no longer be written to (step 423). The decryption algorithm and executable code algorithm are then erased from region 3 of EEPROM 33 and this region is set so that it cannot be written to (step 425). At step 427, the pointer data file 35 is erased from flash memory 37 and the predetermined secure area 42 of region 2 of EEPROM 33 (where the unencrypted target authentication key set is stored is changed to a read-only file (step 429). Finally, a flag is set to prevent reconfiguration of EEPROM 33 (step 431) and the system is ready for normal postage meter operation (step 433).

Returning to step 403, if the answer is yes, a checksum is performed on the unencrypted target authentication key set (step 435). If the checksum result is correct, the predetermined secure region 42 of EEPROM 33 is checked to see if it has been set as a read-only region (step 437). If yes, the meter goes into its normal operation (step 433). If no, the process returns to step 423 and continues through steps 423 to 433.

If at step 435 the answer is no, the key set stored in the predetermined secure area 42 (step 439) is erased and an error message sent (step 441). Likewise, if the answer at step 409 is no, the error message is set at step 441.

Figure 5:
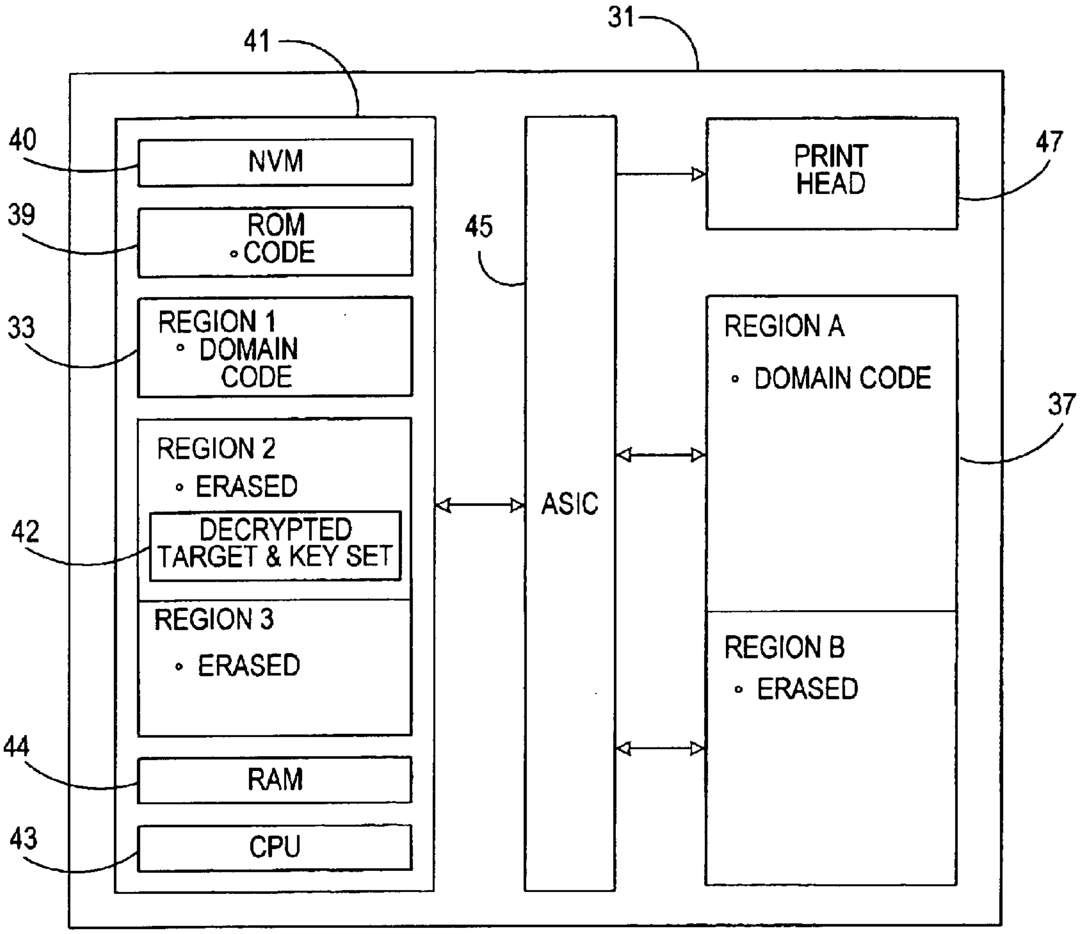
FIG. 5 shows the printhead module of FIG. 2 after the initial power-up process is completed.

FIG. 5 shows the inventive printhead module 31 as configured after the initial power-up phase has been completed as described above. In this configuration, the decrypted target authentication key AK set has been securely loaded into the predetermined secure area 42 of EEPROM 33 in a manner far superior to the prior art method discussed above. Moreover, the printhead modules 31 can be stored prior to their personalization at step 315 of FIG. 3. At this point in time, the printhead 31 can still be utilized in any domain simply by loading the appropriate domain code into region A of flash memory 37. This overcomes the specialized masking and supply problems discussed above in connection with having a plurality of domain specific smart card chip masks. Moreover, in the configuration of FIG. 5 once the initial power-up phase has been completed the postage meter is ready to print postage indicium in the same manner as discussed in connection with the prior art device using the ASIC 45 and printhead 47 in conjunction with the other printhead module 31 components.

Additional advantages and modifications will readily occur to those skilled in the art. Therefore, the invention in its broader aspects is not limited to the specific details and representative devices, shown and described herein. Accordingly, various modifications may be made without departing from the spirit or scope of the general inventive concept as defined by the appended claims. For example, while the preferred embodiment has been described in connection with a postage meter, the method of handling, storing, and dynamically creating and destroying secret keys within a chip can be applied to any product where improved key security is desired. Also, while the preferred embodiment discusses a smart card chip and authentication keys, the inventive process can be applied to any chip and any type of cryptographic keys. Moreover, while the embodiments described above deal with a private key system, the instant invention is also applicable to the secret keys in a public key infrastructure.

Finally, the term "software code" as used in this specification refers to code contained in the inventive apparatus that is used for purposes other than identifying any keys. Such software code includes what is commonly referred to as program code, operation code, machine codes, or instruction codes. The instant invention takes advantage of the situation where the software code that provides functionality for the operation of the apparatus is in the same form as that of a cryptographic key (i.e. both in hexadecimal form). Accordingly, no specific cryptographic key data is stored in the electronic chip. Rather the component parts of the cryptographic key are assembled within the chip by locating corresponding portions of the software code based on pointers imported into the chip at power-up. If an electronic chip is attacked to obtain its cryptographic key, the attempt will be unsuccessful because no specific key data is stored therein. Only when the pointers are made available to the chip can the key be determined and even then after assembly of the key it is erased together with the pointer data file to prevent its recreation.

What is claimed is:

1. A method for dynamically creating in an electronic chip, after its manufacture, a cryptographic key having a plurality of component parts, the method comprising the steps of:

storing software code in a memory device of the electronic chip;

creating a data file having a plurality of pointers, each of the plurality of pointers corresponding to one of the plurality of component parts by identifying a location in the memory device where a portion of the software code is the same as the corresponding one of the component parts;

providing the data file to the electronic chip;

using the plurality of pointers within the electronic chip to obtain the plurality of component parts from the stored software code; and assembling the cryptographic key in the electronic chip using the plurality of component parts obtained from the stored software code;

wherein the memory device is a ROM;

wherein the electronic chip is a smart card chip including the ROM, an EEPROM having an encrypted key, a decryption algorithm, and executable code stored therein, a CPU, and a RAM;

the electronic chip is part of a postage meter that also includes a vault that accounts for postage dispensed by the postage meter and a print-head that includes the electronic chip and a print-head for printing the postage dispensed, the print-head further includes a flash memory in which the data file is stored in encrypted form; and further comprising the steps of during power-up of the postage meter the encrypted data file is read from flash memory into the RAM by the CPU;

the CPU uses the executable code to decrypt the encrypted data file to obtain the plurality of pointers, the CPU uses the plurality of pointers to obtain from the software code component parts of the cryptographic key and to assemble in RAM the cryptographic key from the component parts;

the CPU uses the assembled cryptographic key and the decryption algorithm to decrypt the encrypted key;

the CPU stores the decrypted encrypted key in a secure area of the EEPROM, erases the assembled cryptographic key, and the encrypted data file from the RAM, erases the encrypted key, the decryption algorithm, and executable code from EEPROM, and erases the encrypted data file from the flash memory.

2. The method of claim 1, wherein the software code that is stored is an operating system code.

3. The method of claim 1, wherein the cryptographic key is in hexadecimal form and the software code is stored in the memory device in hexadecimal form.

4. The method of claim 1, wherein the cryptographic key is maintained as a secret decryption key.

5. The method of claim 1, wherein the electronic chip is a smart card chip.

6. The method of claim 5, wherein the plurality of pointers are obtained by scanning the stored software code in the memory device to identity locations in the memory device where the portions of the software code correspond to the plurality of component parts.

7. The method of claim 6, wherein the scanning of the stored software code starts at a random location in the memory device.

8. The method of claim 7, further comprising cryptographically securing the data file that is provided to the electronic chip.

9. The method of claim 1, further comprising storing the software code in a ROM memory device of the electronic chip.

10. A method for securely decrypting in an electronic chip, after its manufacture, an encrypted cryptographic key using a decryption key having a plurality of component parts, the method comprising the steps of:

storing software codes in a memory device of the electronic chip;

creating a data file having a plurality of pointers, each of the plurality of pointers corresponding to one of the plurality of component parts by identifying a location in the memory device where a portion of the software code is the same as the corresponding one of the component parts;

providing the data file to the electronic chip;

using the plurality of pointers in the electronic chip to obtain the plurality of component parts from the stored software code;

assembling the decryption key in the electronic chip using the plurality of component parts obtained from the stored software code;

using the decryption key to decrypt the encrypted cryptographic key;

erasing the pointer data file, the encrypted cryptographic key, and the decryption key from the electronic chip; and storing the decrypted cryptographic key in a secure region of the electronic chip.

11. A method as recited in claim 10, further comprising assembling the decryption key in a volatile memory.

12. A method as recited in claim 11, further comprising storing the software code in a ROM, storing the encrypted cryptographic key and the decrypted cryptographic key in an EEPROM.

13. A method as recited in claim 12, further comprising storing executable code in the EEPROM for performing the assembling of the decryption key and the decrypting of the encrypted cryptographic key, and erasing the executable code from the EEPROM subsequent to the decrypting of the encrypted cryptographic key.

14. The method of claim 12, wherein the stored software code is an operating system code.

15. The method of claim 12, wherein the decryption key and the stored software code are both in hexadecimal form.

16. The method of claim 12, wherein the cryptographic key is a secret key.

17. The method of claim 12, wherein the electronic chip is a smart card chip.

18. The method of claim 12, wherein the plurality of pointers are obtained by scanning the stored software code in the memory device to identify locations in the memory device where portions of the software code correspond to the plurality of component parts.

19. The method of claim 18, wherein the scanning of the stored software code starts at a random location in the memory device.

20. The method of claim 19, further comprising cryptographically securing the data file that is provided to the electronic chip.

* * * * *